United States Patent [19]

Nakamura et al.

[11] 4,097,443

[45] Jun. 27, 1978

[54] METHOD FOR MANUFACTURING FOUNDRY MOLDS

[75] Inventors: Masayuki Nakamura; Setsuo Sanuki, both of Fujieda, Japan

[73] Assignee: Sumitomo Durez Company, Ltd., Tokyo, Japan

[21] Appl. No.: 627,413

[22] Filed: Oct. 30, 1975

[30] Foreign Application Priority Data

Nov. 1, 1974 Japan ............................ 49-125508

[51] Int. Cl.² .............................................. C08K 3/36
[52] U.S. Cl. .................................................... 260/38
[58] Field of Search ................. 260/38, DIG. 40, 844

[56] References Cited

U.S. PATENT DOCUMENTS

| | | | |
|---|---|---|---|
| 1,989,243 | 1/1935 | Nash et al. | 260/DIG. 40 |
| 2,806,832 | 9/1957 | Drumm | 260/38 |
| 2,915,491 | 12/1959 | Smith | 260/38 |
| 3,432,457 | 3/1969 | Robins | 260/30.4 |
| 3,433,701 | 3/1969 | Armour | 260/844 X |
| 3,551,365 | 12/1970 | Matalon | 260/DIG. 40 |
| 3,676,392 | 7/1972 | Robins | 260/38 |
| 3,720,642 | 3/1973 | Junger et al. | 260/38 X |
| 3,943,089 | 3/1976 | Harpula et al. | 260/DIG. 40 |

OTHER PUBLICATIONS

D. F. Gould, Phenalic Resins (1959), p. 44.

*Primary Examiner*—Sandra M. Person
*Attorney, Agent, or Firm*—Peter F. Casella; James F. Mudd; William G. Gosz

[57] ABSTRACT

A method for manufacturing foundry molds, which comprises preforming a foundry sand mixture comprising sand, a resol type phenol-formaldehyde resin, a solvent, and optionally, a curing agent for said resin, or a curing agent for said resin and a thermoplastic resin; and thereafter removing the solvent from the preformed mixture by evaporation.

9 Claims, No Drawings

METHOD FOR MANUFACTURING FOUNDRY MOLDS

BACKGROUND OF THE INVENTION

The present invention relates to a so-called air-setting type self-curing molding process which utilizes the adhesive strength of a resol type phenol-formaldehyde resin and, optionally, a thermoplastic resin, rapidly cured by evaporating the solvent from a solution of the resin.

The binders which have heretofore been used practically in the manufacture of self-curing foundry molds and cores are roughly classified into inorganic binders such as gypsum, cement sodium silicate, etc., and organic binders such as drying oils and cold setting resins and so forth. Gypsum and cement are inexpensive, but they have a disadvantage that because of their water-curing property, the residual moisture in the mold liberated upon exposure to the intense heat of the molten metal poured into the mold, may cause collapse of the mold. They are also inferior in refractoriness and in gas-permeability.

Sodium silicate, as inorganic binding agent, is used in the carbon dioxide process with carbon dioxide as hardening agent, in the exothermal self-curing process in combination with metallic powders such as aluminum, and in the fluid sand self-curing process, with dicalcium silicate and a foaming agent.

These methods have advantages in that the molds produced are inexpensive and they cure in short periods of time. But, they also have serious disadvantages such as poor surface stability, undesirable hygroscopicity, poor mold collapsibility after casting the metals, difficulty in reuse of the sand and so forth.

Where inorganic binders are used, they generally entail a common drawback in that, after casting the metal, mold collapsibility is inferior, so it markedly impedes the shake-out or removal of the metal cast from the mold.

The foregoing disadvantages have given impetus to the development of self-curing molding processes which involve the use of organic binders.

In the case of using organic drying oils as a binder, curing is effected by causing the drying oil to set with ambient air. Accordingly this process is called the "air-setting mold process". With this process, the mold collapsibility after casting molten metal is satisfactory and the mold imparts a smooth surface to the cast product, but this process has some defects such as the curing time being too long, therefore requiring heat treatment and the process itself is restricted by requiring a particular quality of sand.

As for cold setting resins, there is a type curing at ambient temperature by blending a curing agent such as paratoluenesulfonic acid or phosphoric acid with urea (or phenol) furfuryl alcohol formaldehyde copolycondensation resin or resol type phenol-formaldehyde resin and so forth, another cold setting type using a blend of an oil-modified alkyd resin and a polyisocyanate, and still another type used in the cold box process comprising the steps of molding a mixture of sand, phenolic resin and polyisocyanate and subsequently curing the sand mold by exposing it to an organic amine vapor.

These processes have advantages over the processes using inorganic binders in that the mold strength is high, curing at ambient temperature is rapid and mold collapsibility after casting metal is excellent. On the other hand, they have various disadvantages such as high cost, heavy generation of foul or irritant odor such as of amines, formaldehyde or oil during the curing of the mold or pouring of molten metal, undesirable dependency of the quality of the mold on the quality of sand used, difficulties in the adjustment of effective pot life and curing time of the sand mixture.

Although foundry sand binders have characteristics of their own, the most suitable binder for a particular mold making must be selected, with due consideration given to the molding process, size and shape of mold, total number of castings, so actually there exists no universal binder.

SUMMARY OF THE INVENTION

The present invention is directed to a method of manufacturing a foundry mold or core which comprises preforming to a required shape, a foundry sand mixture comprising sand, a resol type phenol-aldehyde resin and an organic solvent, for said resin or a foundry sand mixture comprising the aforementioned components plus a small curing proportion of a curing agent for said resol resin, or said curing agent and a thermoplastic resin, and thereafter removing said solvent by evaporating, e.g., by exposing the preformed mixture to a current of an inert gas (air, for example) which penetrates the preformed mixture or by allowing the preformed mixture to stand under reduced pressure; i.e., subatmospheric pressure.

DETAILED DESCRIPTION OF THE INVENTION

The present invention aims to improve the known binder systems so as to eliminate the disadvantages suffered therewith. The advantages obtained by use of the present invention are as follows:
(1) Mold collapsibility after casting of metal is excellent.
(2) Price of binder is inexpensive.
(3) Less generation of objectionable odor.
(4) Mold strength is high.
(5) No restriction in quality of sand used.
(6) The pot life of sand mixture is long and its curing rate is rapid. ("pot life" is meant the length of time from the preparation of sand mixture up to the time when it is no longer capable of being molded in the mold pattern.)
(7) The sand can be recycled.
(8) The foundry molding equipment is not so expensive.

In the mold making process, the process of the present invention removes solvent, thereby utilizing the bonding strength of the phenolic resin and optionally, that of the thermoplastic resin.

The components which make up the binder for use in the present invention are a resol type phenol-aldehyde resin and a solvent for said resol resin, or the aforementioned components plus a curing agent for said resol resin or said components, plus an organic thermoplastic resin. In all the possible combinations of components mentioned above, the resol type phenol-aldehyde resin invariably constitutes the essential component. The resol type phenol-aldehyde resin is preferably of a kind possessing a high degree of polycondensation. Upon removal of the solvent, this resin exhibits a high bonding strength and gives a mold of high strength. When a curing agent is used, the curing of the binder proceeds slowly in the presence of a solvent, whereas it proceeds rapidly after removal of the solvent to bring about hardening of the phenolic resin and consequently forming a mold of high strength.

The thermoplastic resin is used for the purpose of utilizing its inherent bonding strength for imparting to the mold an added strength enough to withstand the force exerted thereon when the molded product is removed from the pattern.

The term "resol type phenol-aldehyde resin" as used in the present invention refers collectively to resol type phenol-aldehyde resins such as phenol-formaldehyde resol resins and resol type phenol-aldehyde resins modified with conventional components such as urea, melamine, cashew nut shell oil and furfuryl alcohol. While use of resol resins prepared by condensation of phenol itself with formaldehyde is preferred, other suitable resol resins include those prepared from the phenols and aldehydes disclosed as starting materials for resol resins in column 3 of F.M. Kujawa et al, U.S. Pat. No. 3,497,465, the pertinent disclosure of which is incorporated herein by reference. When a given resol type phenol-aldehyde resin has an excessively high water content, removal of the solvent and water by permeation of gas or by vacuum cannot be realized satisfactorily. Therefore, the resol resin should preferably be substantially anhydrous, i.e., the water content of said resin should not exceed 10% by weight.

By the term "curing agent" as used in the present invention is meant strong acidic substances such as paratoluene sulfonic acid, benzene sulfonic acid, sulfuric acid, ortho-phosphoric acid, hydrochloric acid and so forth, which are conventionally used to cure resol resins. A small curing amount of curing agent, advantageously about 0.0075 to 0.45% by weight, based on the weight of sand, is employed in accordance with conventional practice in curing resol resins.

The term "solvent" as used in the present invention refers to individual liquids or mixtures of liquids conventionally employed as volatile solvents for the aforementioned resol resins which liquids include alcohols such as methanol, ethanol, propanol, etc.; ketones such as acetone, methylethyl ketone, diacetone alcohol, etc.; esters such as ethyl acetate, butyl acetate, etc.; aromatic compounds such as toluene, xylene, etc.; and mineral terpentines, solvent naphtha, dioxane, furfural, furfuryl alcohol, butyl "Cellosolve", "Cellosolve" acetate, etc. The resol resin solvent also serves to dissolve any thermoplastic adjuvant resin which may be used. A suitable solvent is selected according to the kind of resin used, with due consideration given to the ease in removal of solvent and the ease of drying the sand mixture. Generally, methanol, toluene, butyl acetate, acetone, etc., being inexpensive, prove most advantageous. In determining the amount of the solvent to be added, resin viscosity will serve as a criterion. The latter property is related to the covering characteristic and the workability of the mixture exhibited on the sand so that the viscosity preferably should not be more than about 10 poises at 25° C. Generally, satisfactory results are obtained in employing about 0.2% to about 7% by weight of the solvent based on the weight of sand used.

Suitable thermoplastic resins for use in the preformed mixture according to a preferred embodiment of the present invention include styrene polymer resin, vinyl acetate polymer resin, novolac type phenol-aldehyde resin, e.g., a phenol-formaldehyde novolac resin, benzylic ether type phenol-formaldehyde resin, petroleum resins, rosin type resins, coumarone-indene resins, epoxy resins, etc. Of the foregoing resins, styrene polymer resin and vinyl acetate polymer resin are preferred because of their bonding strength.

In carrying out the process of the present invention, a foundry sand mixture is prepared by thoroughly mixing a foundry sand with the resin binder specified by the present invention. The amount of the binder, i.e., resole resin and thermoplastic resin, if any, added to the foundry sand is in the range of from about 0.5% to about 3% by weight computed as solid resin based on the weight of sand with the amount of thermosetting resol resin being about 0.25% to about 3% and the amount of thermoplastic resin being up to about 2.75% and preferably at least about 0.25% based on the weight of the sand. Sufficient strength is manifested as long as the amount of binder used falls within the range of about 0.5 to 3%. The combined components are subjected to mechanical mixing or agitation for a short period. Prolonged mixing is undesirable because it increases the possibility of the solvent being lost by evaporation. The resultant mixture is placed in the hopper of a shell core machine and preformed or molded in a metallic pattern under compression. The solvent in the preformed mixture is then removed, advantageously at a relatively low temperature of about 20° to about 50° C., by either exposing the mold to a current of a gas, for example, air under a pressure of 0.2 - 5.0 kg/cm$^2$ or allowing it to stand under vacuum. Although the purging gas may be an inert gas other than air, which is equally effective, use of inexpensive air will suffice for the purpose. The waste gas containing the released solvent may be disposed of by incineration. Alternatively the solvent can be recovered and reused. Accordingly, disposal of the waste gas is accomplished without any difficulty.

To ensure a smooth release of the molded mixture from the metallic pattern in the operation of the present invention, it is desirable that a small effective amount of a conventional mold release agent such as plasticizers, silicone resins, fatty acids, oils and fats, etc., be incorporated in the foundry sand mixture. If a moldwash is required, it proves appropriate to use an aqueous moldwash.

The advantages of the present invention over known methods of preparing foundry sand molds are as follows:

(1) Substantially no objectionable or irritant odor is emitted at the time of casting molten metal in the mold.
(2) The mold shows excellent collapsibility after casting molten metal, so that the foundry sand from collapsed molds can be used repeatedly.
(3) The binder is not affected in any way by the quality of the foundry sand in use.
(4) Pot life is longer and the curing rate is rapid.
(5) The case surface of the core side is smooth.

The following example may be cited as a specific application of the present invention. When the "V" process (Vacuum Sealed Molding Process), a process of recent development in Japan is adopted for casting a product, the core pattern sometimes has a protuberance which cannot be properly covered with the film because of insufficient elongation of the film, a drawback of the V process. It is here where the process of the present invention can be utilized for the formation of only the protuberance in the mold.

The following examples are presented to illustrate and explain more particularly the present invention, but it should be understood that the present invention is not restricted thereby. The "percentages" indicated in these examples are by weight unless otherwise specified.

EXAMPLE 1

A reaction kettle was charged with 1,000 g of phenol, 1,120 g of 37% formalin, 60 g of aniline and 20 g of sodium hydroxide. The contents were refluxed for 50 minutes and subsequently unreacted phenol and water were eliminated under vacuum. Thereafter, 200 g of methanol and 50 g of acetone were added and the reaction mixture was held at 75° C for 2 hours for further reaction in order to promote the degree of polycondensation.

Five hundred (500) g of methanol and 100 g of acetone were added to the resultant polycondensate and cooled, thereby adding 3 g of a proprietary silane coupling agent (Union Carbide A-1,000).

Consequently, a resin solution having 55% of resin content was obtained.

In a laboratory whirl mixer 180 g of said resin solution and 5 kg of foundry said mixture was charged to a shell core machine and a sand mold was preformed in a metallic pattern (50 mm × 50 mm in diameter). Subsequently, the preform was exposed to a current of air at 45° C under pressure of 3 kg/cm$^2$ for 30 or 60 seconds. The finished mold was removed from the metallic pattern and tested for compressive strength. The results were as shown in the Table (of page 12).

EXAMPLE 2

Five (5) kg of foundry sand, 25 g of curing agent (60% methanol solution of paratoluene sulfonic acid) and 10 g of methanol were thoroughly mixed. The resultant mixture was mixed with 160 g of the resin solution of Example 1 for 40 seconds to produce a foundry sand mixture. Thereafter, the mixture was treated by following the procedure of Example 1 to obtain a finished mold, which was tested for compressive strength. The results were as shown in the Table (of page 12).

The pot life of the foundry sand mixture was more than five hours.

EXAMPLE 3

A resin solution having a resin content of 51% was obtained by mixing 1,000 g of the resin solution of Example 1 with 1,000 g of vinyl acetate polymer resin (50% methanol solution of Vinylol S, a proprietary 47% methanolic solution of vinyl acetate homopolymer made by Kobunshi Kagaku Co., Ltd.).

Separately in a laboratory whirl mixer, 5 kg of foundry sand, 30 g of curing agent (60% methanol solution of paratoluene sulfonic acid) and 10 g of methanol were mixed for 60 seconds and thereafter mixed with 160 g of said resin solution for 40 seconds, to produce a foundry sand mixture. This foundry sand mixture was charged in a shell core machine, then premolded in a metallic pattern and then passed air at 25° C under 4 kg/cm$^2$ for 30 to 60 seconds. Thereafter, the finished mold was removed from the pattern and tested for compressive strength. The results were shown in the Table (of page 12).

The pot life of the foundry sand mixture was more than three hours.

EXAMPLE 4

A resin solution having a resin content of 50% was obtained by mixing 1,000 g of the resin solution of Example 1 with 50 g of Vinsol Resin (a proprietary thermoplastic resin made by Hercules Powders), 55 g of methanol and 400 g of vinyl acetate resin (Vinylol S).

Separately in a laboratory whirl mixer, 5 g of foundry sand and 50 g of curing agent (75% aqueous phosphoric acid solution) were mixed for 60 seconds and then mixed with 250 g of said resin solution for 40 seconds to produce a foundry sand mixture. This foundry sand mixture was charged to a shell core machine, preformed in a metallic pattern and allowed to stand for 60 seconds under vacuum. Thereafter, the vacuum was split and the finished mold was removed from the metallic pattern and tested for compressive strength. The results were as shown in the Table (of page 12).

EXAMPLE 5

A reaction kettle was charged with 1,000 g of phenol, 200 g of cashew nut shell oil, 1,540 g of 37% formalin and 50 g of 50% aqueous sodium hydroxide solution. The contents were refluxed for 60 minutes and then freed of unreacted phenol and water under vacuum. To the resultant reaction mixture was added 300 g of butyl acetate, and this was held at 60° C for one hour to undergo reaction. To this mixture were added 700 g of toluene, 1,000 g of butyl acetate and 300 g of styrene resin (Styron 666 made by Asahi-Dow, Limited) and the matter was further heated at 60° C for one hour in order to dissolve the styrene resin. Thus, a resin solution having a resin content of 40% was obtained.

Consequently, in a laboratory whirl mixer, 5 kg of foundry sand, 25 g of a curing agent (60% methanol solution of paratoluene sulfonic acid) and 20 g of methanol were mixed for 60 seconds and then mixed with 200 g of said resin solution for 40 seconds to produce a foundry sand mixture.

Thereafter, the foundry sand mixture was processed by following the procedure of Example 1 to obtain the finished mold. The mold was tested for compressive strength. The results were as shown in the Table (of page 12).

COMPARATIVE EXAMPLE 1

In a laboratory whirl mixer, 5 kg of foundry sand, 100 g of linseed oil, 5 g of sodium perborate and 10 g of cobalt naphthenate (having a cobalt content of 6%) were mixed for 60 seconds to obtain a foundry sand mixture. This foundry sand mixture was charged to a shell core machine, molded in a metallic pattern, thereafter exposed to a current of air at 35° C under 3 kg/cm$^2$ of pressure for five minutes. At the end of the process the mold failed to exhibit enough strength to permit safe release of the mold from the pattern.

COMPARATIVE EXAMPLE 2

In a whirl mixer, 5 kg of foundry sand, 75 g of a linseed oil-modified alkyd resin and 3.5 g of catalyst (a mix of cobalt naphthenate having a cobalt content of 6% and dibutyl tin dilaurate of a ratio of 9:1) were mixed for 60 seconds and then mixed with 18 g of polyisocyanate (Sumidule 44V-20 made by Sumitomo-Bayer Urethane, Ltd.) for 40 seconds to obtain foundry sand mixture. This foundry sand mixture was immediately packed in a wooden pattern measuring 50 mm × 50 mm in diameter, left to stand at ambient temperature and tested for compresive strength. The results were as shown in the Table (of page 12).

The test pieces obtained in Examples 1 through 6 and in Comparative Example 2 were coated with a zirconium-based aqueous moldwash and used as cores of tests molds for casting metal at 1,400° C. All the molds showed good collapsibility and the cast surfaces of the core sides were smooth. The odor emitted during casting was less in cases of using test pieces of Examples 1 through 6 than test pieces of Comparative Example 2.

TABLE

| | COMPRESSIVE STRENGTH TEST RESULTS | | | | | | |
|---|---|---|---|---|---|---|---|
| Example Nos. | 1 | 2 | 3 | 4 | 5 | Comparative Example 1 | Comparative Example 2 |
| Amount of resin added (resin content, based on sand) (%) | 2.0 | 1.75 | 1.6 | 2.5 | 1.6 | 2.0 | 1.5 |
| Compressive Strength (kg/cm$^2$) | | | | | | | 4.2* after 0.5 hour standing |
| after passing air for 30 seconds | 6.1 | 6.2 | 11.3 | — | 10.1 | 0 | 19.9* after one hour standing |
| after passing air for 60 seconds | 14.4 | 13.7 | 21.1 | 27.7 | 20.4 | 0 | 25.0* after three hours standing |
| Compressive Strength (kg/cm$^2$) after 24 hours standing at ambient temperature following removal from pattern subsequent to 60 seconds | 30.2 | 44.1 | 46.0 | 48.9 | 45.2 | (5.2) | 46.2* after 24 hours |

Note:
*The test values for Comparative Example 2 were those exhibited after standing at ambient temperature.

We claim:

1. A self-curing process for manufacturing foundry sand cores and molds which comprises preforming a mixture consisting essentially of the sand, resin consisting essentially of a phenol-formaldehyde resol resin and a volatile organic solvent for said resol resin selected from the group consisting of methanol, ethanol, propanol, acetone, methylethyl ketone, diacetone, ethyl acetate, butyl acetate, and mixtures thereof, the amount of resin being about 0.5 to 3 weight percent based on the weight of sand and the amount of solvent being about 0.2 to about 7 weight percent based on the weight of sand and evaporating the solvent from said preformed mixture at about 20° C. to about 50° C. to harden the resin and obtain the foundry mold composition.

2. The process of claim 1 wherein the preformed mixture also contains a curing amount of a curing agent for said resol resin.

3. The process of claim 2 wherein the resin component of preformed mixture also contains up to about 2.75 weight percent of an organic thermoplastic resin based on the weight of the sand.

4. The process of claim 2 wherein the solvent is selected from the group consisting of methanol, butyl acetate and acetone.

5. The process of claim 2 wherein the curing agent is selected from the group consisting of para-toluene sulfonic acid, benzene sulfonic acid and phosphoric acid.

6. The process as claimed in claim 5 wherein the amount of curing agent is about 0.0075 to about 0.45 weight percent based on the weight of sand.

7. The process as claimed in claim 1 wherein the resol resin is a substantially anhydrous phenol-formaldehyde resol resin.

8. The process as claimed in claim 1 wherein the solvent is evaporated from the preformed mixture under a subatmospheric pressure at a temperature of about 20° to about 50° Centigrade.

9. The process as claimed in claim 1 wherein the solvent is evaporated from the preformed mixture by passing a stream of inert gas through the preformed mixture at a pressure of about 0.2 to about 5 kg/cm$^2$ and a temperature of about 20° to about 50° Centigrade.

* * * * *